United States Patent [19]

Kolchinsky et al.

[11] Patent Number: 5,002,253
[45] Date of Patent: Mar. 26, 1991

[54] SOLENOID VALVE

[75] Inventors: Abel E. Kolchinsky, Riverwoods; Felix Aronovich, Buffalo Grove, both of Ill.

[73] Assignee: Sterling Hydraulics, Inc., Schaumburg, Ill.

[21] Appl. No.: 428,760

[22] Filed: Oct. 30, 1989

[51] Int. Cl.$^5$ ............................................. F16K 31/06
[52] U.S. Cl. .............................. 251/129.15; 251/30.03
[58] Field of Search ......................... 251/129.15, 30.03

[56] References Cited

U.S. PATENT DOCUMENTS 4,540,154  9/1985  Kolchinsky et al. ............ 251/129.15
4,683,454  7/1989  Vollmer et al. .................. 251/129.15

OTHER PUBLICATIONS

Sterling Hydraulics Limited catalog-pp. G09 and G10.

Primary Examiner—Arnold Rosenthal
Attorney, Agent, or Firm—Wood, Phillips, Mason, Recktenwald & VanSanten

[57] ABSTRACT

A solenoid coil assembly for a solenoid valve includes an electrical coil wound about a valve armature to develop a magnetic field for actuating the armature responsive to an electrical current passing through the coil. A case surrounds the coil. The case has opposite end walls and a top wall, a bottom wall and opposite side walls connected between the end walls. A pair of electrical connectors are connected to opposite ends of the coil and extend outwardly from the top wall. A metal yoke has opposite end walls connected by a top wall and a bottom wall. The yoke is received on the case with their respective end walls, top walls and bottom walls in alignment.

8 Claims, 2 Drawing Sheets

SOLENOID VALVE

FIELD OF THE INVENTION

This invention relates generally to solenoid valves and, more particularly, to an improved solenoid coil assembly therefor.

BACKGROUND OF THE INVENTION

Solenoid valves are suitable for a wide variety of applications and may comprise cartridge valves such as, for example, both direct acting and pilot operated on/off poppet valves.

In one form of a pilot operated poppet valve, a spring acts on an armature to selectively open or close a pilot valve in the center of a poppet depending upon whether the valve is of a normally open or normally closed type. The armature is movable within a solenoid, which includes an energizable coil. When the solenoid coil is energized, the pilot valve is actuated.

A typical prior solenoid coil assembly includes a coil wound on a bobbin and surrounded by a yoke made of a ferromagnetic material. As is well known, the yoke operates to enhance the magnetic conduction or flex density to improve operation. This assembly is encapsulated in a plastic case to retain the same in assembled relation and provide an outer housing. A ferromagnetic washer may also be included in the assembly between one end wall of the case and the yoke. The washer serves the same purpose as the of the housing for connecting to a source of power. One for the plastic case to crack. Specifically, owing to thermal characteristics, the metal yoke expands and contracts at a different rate from the plastic case causing thermal shock which results in cracking of the plastic.

One known solution of the thermal shock problem involves placing the yoke outside of the plastic case. A prior known solenoid assembly includes a plastic case encapsulating a coil and having a top wall, a bottom wall and opposite side walls. One of the end walls has an encapsulated ferromagnetic washer. The top wall is provided with a housing for electrical connectors which are connected to the coil. A metal yoke which is rectangular in configuration has opposite end walls connected by opposite side walls. The yoke is mounted on the plastic casing with its respective end walls and side walls in alignment with the end walls and side walls of the case.

Various valve packages are available which utilize cartridge valves to provide segments of hydraulic circuits ranging from single valves to multi-function manifolds. Such packages can be preassembled and tested for installation in a hydraulic circuit. Particularly, assemblies known as polyhydrons have been utilized to satisfy such requirements. The polyhydron provides interconnections between cartridge valves by drilled holes, thereby eliminating pipe work, expensive fittings and reducing the potential for leakage. Because the valves are mounted closer together pressure losses are reduced and hydraulic circuits become more efficient. The elimination of pipe work results in a neater installation, saving assembly time and wait. Because the package is installed as one complete unit the possibility of introducing contamination of the circuit during assembly is also reduced.

With a polyhydron type valve package it may be necessary to closely mount several cartridge valves. However, access must be provided for electrical connections to the valve solenoids. Thus, with the above-described cartridge valve, including an outer yoke, access must be provided to the top wall mounted housing Further, the outer yoke side walls require that adjacent cartridge valves must be further spaced from one another to allow room for the same, resulting in an increase in the size, and thus weight, of the polyhydron. Also, this type of coil is non-symmetrical, requiring that it be installed on a valve with the end wall having the washer on the side opposite the valve. The reversed installation leads to loss of solenoid power.

The present invention is directed to overcoming one or more of the problems discussed above.

SUMMARY OF THE INVENTION

In accordance with the invention, a solenoid coil assembly includes an outer yoke which requires less available space.

Broadly, there is disclosed herein a solenoid comprising a bobbin having a through opening defining a central axis, and an electrical coil wound about the bobbin coaxial with the axis to develop a magnetic field in the opening responsive to an electrical current passing through the coil. A case surrounds the coil. The case has opposite end walls perpendicular to the axis and a top wall, a bottom wall and opposite side walls connected between the end walls. A pair of electrical connectors are connected to the opposite ends of the coil and extend outwardly from the top wall. A metal yoke has opposite end walls connected by a top wall and a bottom wall. The yoke is received on the case with their respective end walls, top walls and bottom walls in alignment.

It is a feature of the invention that the yoke bottom wall is the same size as the yoke top wall.

It is another feature of the invention that the yoke end walls include openings aligned with the bobbin through opening.

It is a further feature of the invention that the case comprises a connector housing disposed above the case top wall and carrying the electrical connectors.

It is still a further feature of the invention that a portion of the connector housing is spaced from the case top wall to define a space and the yoke top wall is received in said space.

It is another feature of the invention that the yoke dimensions are determined so as to eliminate the end wall washer. As a result, the coil is symmetrical, making it convenient to use.

It is an additional object of the invention to provide a solenoid coil assembly for a solenoid valve including a valve and an armature moveable along an axis for actuating the valve. An electrical coil is wound about the armature coaxial with the axis to develop a magnetic field for actuating the armature responsive to an electrical current passing through the coil. A case surrounds the coil. The case has opposite end walls perpendicular to the axis and a top wall, bottom wall and opposite side walls connected between the end walls. A pair of electrical connectors are connected to opposite ends of the coil and extend outwardly from the top wall. A metal yoke has opposite end walls connected by a top wall and a bottom wall. The yoke is received on the case with their respective end walls, top walls and bottom walls in alignment.

Further features and advantages of the invention will readily be apparent from the specification and from the drawings.

DETAILED DESCRIPTION OF THE INVENTION

Figure 1:
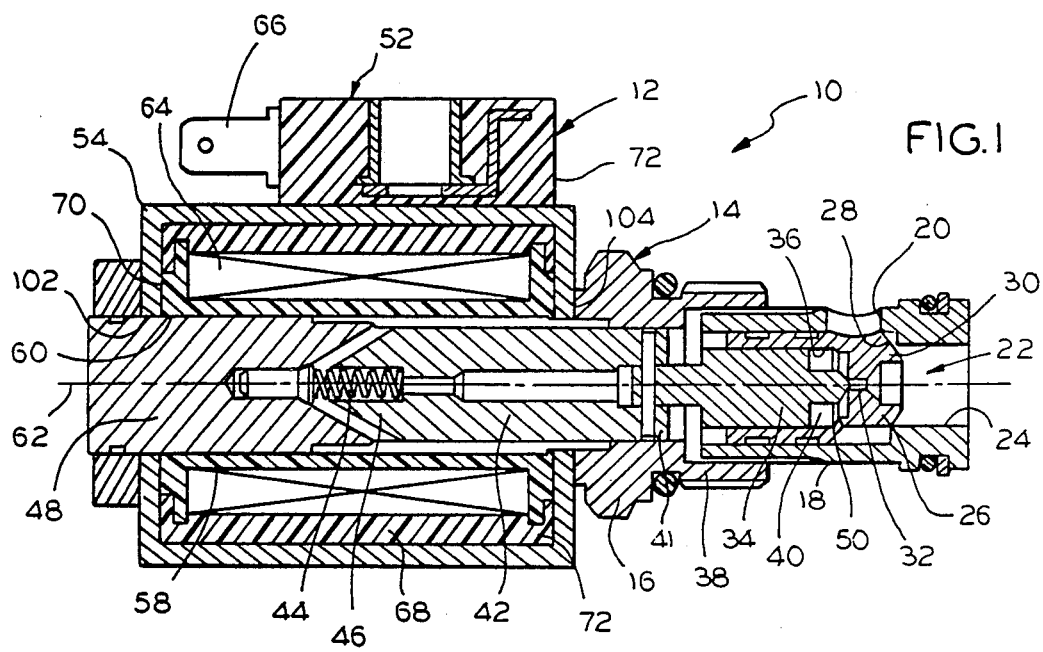
FIG. 1 is a diagrammatic section of a cartridge valve including a solenoid coil assembly embodying the invention.

With reference to FIG. 1, a cartridge valve 10 includes a solenoid coil assembly 12 according to the invention for operating a valve assembly 14. The illustrated cartridge valve 10 comprises a normally closed pilot operated poppet type valve.

In accordance with the broad concepts of the invention, the solenoid coil assembly 12 can be used with any cartridge type valve, as will be obvious to those skilled in the art.

The poppet valve assembly 14 includes an adapter 16 which receives a seat member 18. The seat member 18 may be received in the adapter 16 in any known manner. The seat member 18 is provided with suitable means for being received in a fluid port, such as, for example, a drilled bore in a polyhydron or manifold.

The seat member 18 is provided with a side opening 20 which opens radially inwardly into a valve chamber 22. An end opening 24 opens axially from the valve chamber 22 and is normally closed by a valve member, or poppet, 26 seating on an annular seat 28 of the seat member 18 at an inner end of the end opening 24.

The valve member 26 comprises a poppet valve having a seating portion 30 engaging the valve seat 28 and provided with an axial bore 32 which is normally closed by a pilot valve 34 received in a cylindrical recess 36 of the valve member 26. The pilot valve 34 provides fluid communication between a transfer chamber 38 and a pilot valve chamber 40.

The pilot valve 34 includes an inner end 41 secured to a solenoid armature, or plunger, 42. In a normally closed arrangement of the poppet valve assembly 14, the plunger 42 is biased outwardly by a helical coil spring 44 acting between an inner end portion 46 of the plunger 42 and a plug 48.

In operation, when system pressure is applied to the side port opening 20, it is kept closed by the coil spring 44 acting on the plunger inner end 46 closing off the pilot valve 34 in the center of the poppet 26. When the solenoid coil assembly 12 is energized, as discussed below, the armature 42 is pulled away from the bore 32 allowing pilot flow through an orifice 50 in the poppet 26 between the valve chamber 22 and the pilot valve chamber 40. This pilot flow through the orifice 50 causes a pressure imbalance across the poppet 26 which opens the same to allow opening 24.

Figure 2:
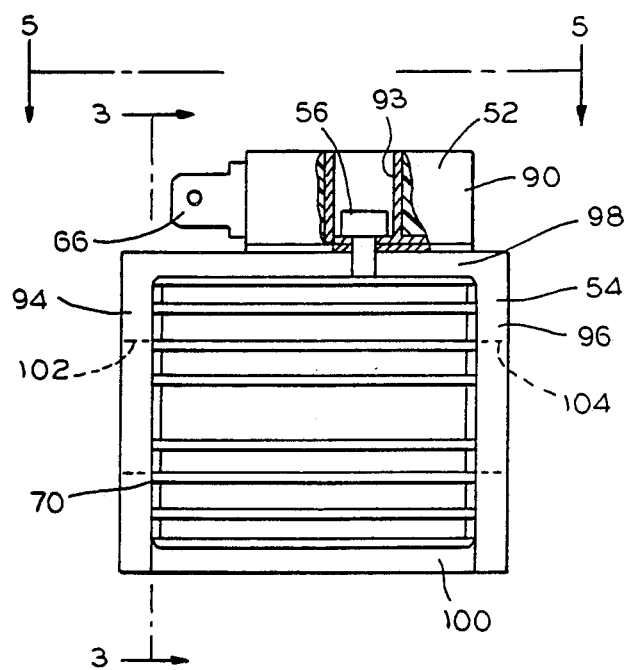
FIG. 2 is a side elevation, with parts cut away for clarity, of the solenoid coil assembly of the valve of FIG. 1.
Figure 3:
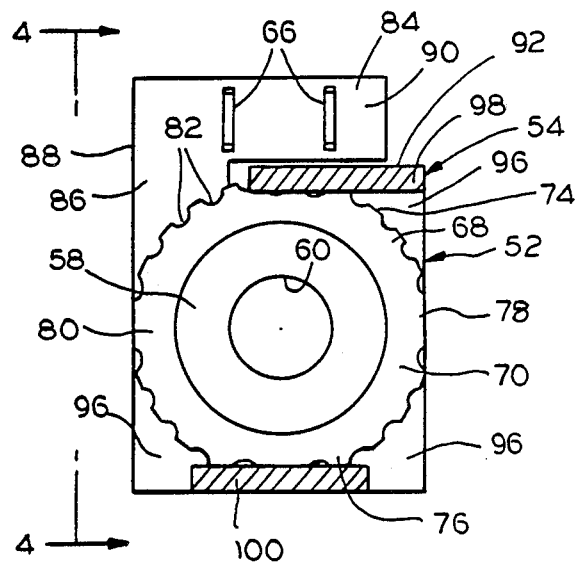
FIG. 3 is a section taken along the line 3—3 of FIG. 2.
Figure 4:
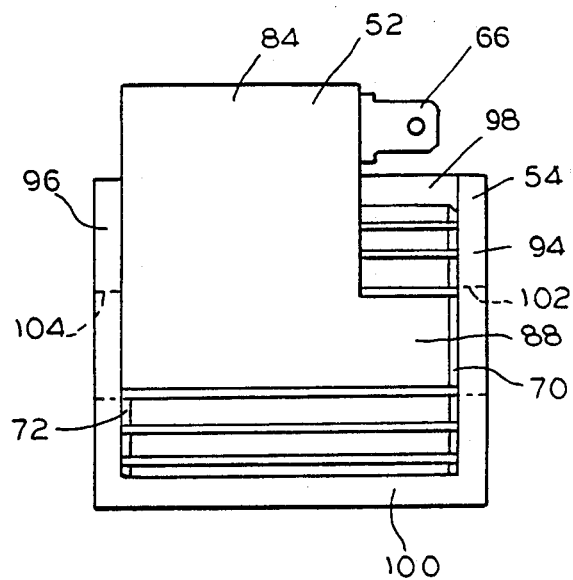
FIG. 4 is an opposite side elevation view taken along the line 4—4 of FIG. 3.
Figure 5:
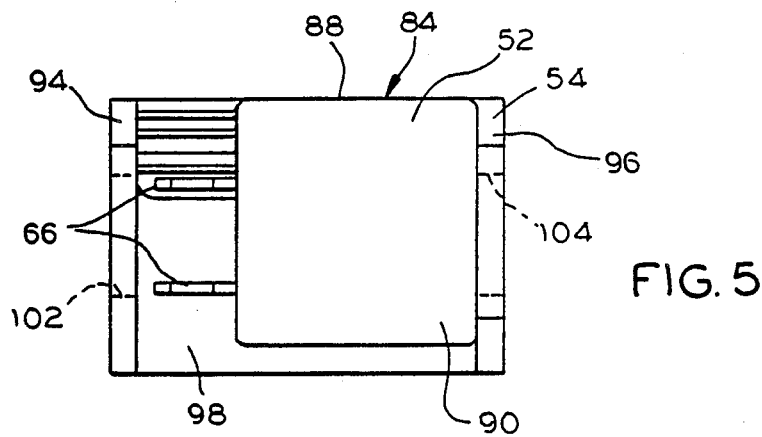
FIG. 5 is a plan view taken along the line 5—5 of FIG. 2.

With reference also to FIGS. 2-5, the solenoid coil assembly 12 includes a coil sub-assembly 52, an outer shell 54, and a screw 56, see FIG. 2.

With specific reference to FIG. 1, the coil sub-assembly 52 includes a bobbin 58 having a central through opening 60 defining an axis represented by a line 62. A coil 64 is wound about the bobbin 58. The coil 64 comprises a multi-turn winding with the number of turns and size of the wire determined according to the voltage and power requirements, as is well known. The ends of the coil 64 are connected to electrical connectors, such as male connectors 66. As is well known, application of power across the connectors 66 causes current flow through the coil 64 to produce a magnetic field within the bobbin through opening 60. This magnetic field acts on the plunger, or armature, 42, shown in FIG. 1 to actuate the cartridge valve 10.

The coil sub-assembly 52 is encased in a plastic case 68. Specifically, the case 68 in the illustrated embodiment comprises a molded plastic case which encapsulates the coil 64 and the bobbin 60. The case 68 includes opposite end walls 70 and 72. The end walls 70 and 72 are interconnected by a top wall 74 and opposite, bottom walls 76, and also by opposite and parallel side walls 78 and 80. The side walls 78 and 80 interconnect the top wall 74 and the bottom wall 76 to provide a generally square configuration. The case walls are provided with a plurality of axial ridges 82.

The case 68 includes a connector housing 84 disposed above the top wall 74. The connector housing 84 is L-shaped and includes a lower portion 86 connected to the top wall 74 and having an outer wall 88 flush with the side wall 80. A housing upper portion 90 houses and supports the connectors 66 and is spaced outwardly from the top wall 74 to define a space 92 therebetween. The space 92 is laterally open from the coil assembly side wall 78 to the connector housing lower portion 86. An aperture 93 is provided through the top of the housing upper portion 90 for receiving the ground screw 56, see FIG. 3.

The outer shell 54 comprises a yoke made of ferromagnetic material. The yoke 54 includes opposite, parallel end walls 94 and 96 connected by a top wall 98 and an opposite, parallel bottom wall 100. The yoke 54 may be of single piece construction, or may have separate walls which are secured together by any known means, as necessary, or desired.

The yoke end walls 94 and 96 are generally square in the illustrated embodiment corresponding to the size of the case end walls 70 and 72, and include respective central circular openings 102 and 104. The openings 102 and 104 are identical in diameter and, in fact, are substantially identical in diameter to the bobbin through opening 60. The top wall 98 and bottom wall 100 are generally rectangular and have a length slightly greater than that of the case top and bottom walls 74 and 76, but having a narrower width. Specifically, the yoke dimensions are determined with the consideration of eliminating the need for an end wall washer, thus providing a symmetrical coil. The yoke bottom wall 10 is centrally positioned relative to its end walls 94 and 96, while the top wall 98 is offset from center and, in fact, has one edge slugh with the side edge of the yoke ends walls 94 and 96. The width of the top wall 98 is less than the space 92 described above between the case side wall 78 and the connector housing lower portion 86.

The yoke 54 is mounted to the coil sub-assembly 52 by sliding it into position so that the yoke end walls 94 and 96 are in alignment with the case end walls 70 and 72 and their respective openings 102 and 104 in alignment with the bobbin central opening 60. Similarly, the yoke top and bottom walls 98 and 100 are aligned with the case top and bottom walls 74 and 76, respectively. Specifically, the yoke bottom wall 100 is centered relative to the case bottom wall 76. The yoke top wall 98 is received in the space 92 between the case top wall 74 and the enclosure housing 84.

As is well known, the yoke 54 carries the magnetic field developed in the coil 64, see FIG. 1, and is effective to increase the flux density, or magnetic induction, developed thereby.

By supporting the yoke 54 outwardly of the case 70, the structural integrity of the case is enhanced. Specifically, thermal expansion of the yoke 54 will not cause cracking of the plastic case 70. Further, since the yoke 54 does not extend beyond the case side walls 78 and 80, the valve 10 may be closely mounted to adjacent valves on either side.

Thus, the invention broadly comprehends a solenoid coil assembly including an outer yoke which permits side-by-side installation to adjacent solenoids in close proximity.

What is claimed is:

1. In a solenoid valve including a valve and an armature movable along an axis for actuating said valve, a solenoid coil assembly comprising:

an electrical coil wound about said armature coaxial with said axis to develop a magnetic field for actuating said armature responsive to an electrical current passing through said coil;

an outer case surrounding said coil, said case having opposite end walls perpendicular to said axis and a top wall, a bottom wall and opposite sidewalls connected between said end walls;

a pair of electrical connectors connected to opposite ends of said coil and extending outwardly from said top wall; and a metal yoke having opposite end walls connected by a top wall and a bottom wall, said yoke being removably received on said case with the respective end walls, top walls and bottom walls in alignment.

2. The solenoid coil assembly of claim 1 wherein said yoke top wall is the same size as said yoke bottom wall.

3. The solenoid coil assembly of claim 1 wherein said yoke end walls include openings for receiving said plunger.

4. The solenoid coil assembly of claim 3 wherein said openings are of the same diameter to provide a symmetrical coil.

5. The solenoid coil assembly of claim 1 wherein said case further comprises a connector housing disposed above said case top wall and carrying said electrical connectors.

6. The solenoid coil assembly of claim 5 wherein a portion of said connector housing is spaced from said case top wall to define a space and said yoke top wall is received in said space.

7. The solenoid coil assembly of claim 1 wherein said case comprises a plastic case.

8. The solenoid coil assembly of claim 7 wherein said coil is encapsulated in said case.

* * * * *